United States Patent Office 2,871,260
Patented Jan. 27, 1959

2,871,260

TETRAFLUOROADIPIC ACIDS AND DERIVATIVES

John J. Drysdale, Clifton Park Manor, Del., assignor to E. I. du Pont de Nemours and Company, Wilmington, Del., a corporation of Delaware No Drawing. Application April 13, 1956
Serial No. 577,917

8 Claims. (Cl. 260—485)

This invention relates to dicarboxylic acids, and more particularly to certain fluorodicarboxylic acids and to a method for their preparation.

This application is a continuation-in-part of my copending application Serial No. 454,607, filed September 7, 1954.

Fluorinated dicarboxylic acids of various types are known and they are useful in a variety of applications, the utility of these acids in any particular application being dependent on the particular number and arrangement of fluorine atoms and the number of carbon atoms in the chain separating the carboxyl groups.

This invention has as an object the preparation of new fluorodicarboxylic acids having new or improved properties resulting from the number and arrangement of fluorine atoms in the molecule. A further object is the preparation of new polyfluoro dicarboxylic acids useful as polyester resin and polyamide resin intermediates. Still another object is the preparation of intermediates for the preparation of films, coating compositions and plastics. A still further object is the preparation of plasticizers for resins. Other objects will appear hereinafter.

These objects are accomplished by the present invention of tetrafluoroadipic acids having two fluorine atoms on each of two adjacent carbons of the four-carbon aliphatic chain separating the carboxyl groups and having two hydrogen atoms on each of the remaining two carbons of the chain, and certain of their esters.

The tetrafluoroadipic acids of this invention are prepared by ozonization of tetrafluorocyclohexenes having two fluorine atoms attached to each of two adjacent carbon atoms of the cyclohexene ring with the remaining annular carbons being unsubstituted, followed by cleavage of the resultant ozonide in the presence of hydrogen peroxide.

The process of this invention is illustrated by the following equations for the synthesis of 3,3,4,4-tetrafluoroadipic acid from 4,4,5,5-tetrafluoro-1-cyclohexene:

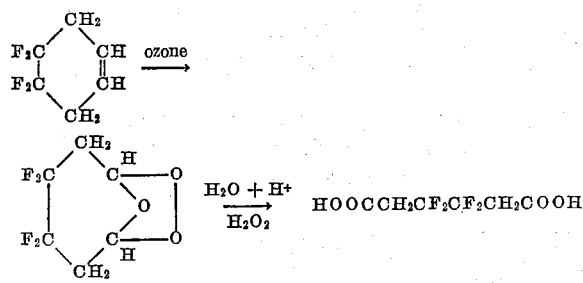

A preferred manner of carrying out the ozonization step of this invention comprises passing a stream of oxygen containing a small amount, e. g., 2%, of ozone through a solution of the tetrafluorocyclohexene in an inert solvent, e. g., methylene chloride, maintained at low temperature, e. g., at about −70 to −80° C., by means of a bath of acetone and solid carbon dioxide, until absorption of ozone ceases. This end point is readily observed by the reaction mixture turning to a blue color when there is excess ozone in the methylene chloride.

The cleavage of the ozonide is carried out in the second step of this invention. The methylene chloride solution of the ozonide is added gradually to an aqueous solution of hydrogen peroxide containing at least one mole, but preferably an excess, e. g., two moles, of hydrogen peroxide for each mole of the ozonide of the tetrafluorocyclohexene, being reacted, and acidified with a strong acid, e. g., sulfuric acid. The cleavage or hydrolysis reaction is exothermic. The reaction mixture is allowed to reflux slowly with the methylene chloride being allowed to boil off, if necessary by external application of heat, until the reaction mixture becomes clear. The solution is then cooled to about 25° C., and then extracted with diethyl ether. The ether-acetic acid layer is evaporated to dryness under reduced pressure. The resulting white solid residue of the tetrafluoroadipic acid is purified by disssolving it in water, filtering it, and then extracting the aqueous filtrate with diethyl ether. The ether extract is evaporated to dryness and the purified tetrafluoroadipic acid is dried over a desiccating agent, e. g., phosphorus pentoxide. If desired, the acid can be recrystallized from xylene.

If desired, the methylene chloride solvent used in the ozonization step can be removed before the ozonide is hydrolyzed. In this embodiment of the process, the methylene chloride can be evaporated at reduced pressure and the residue from the ozonization step then dissolved in glacial acetic acid. This acid solution of the ozonide can then be added to the acidified aqueous solution of hydrogen peroxide and the hydrolysis product worked up as described above.

The process of this invention is not limited to the use of methylene chloride in the ozonization step. Other inert solvents, i. e., solvents for the reactants that resist oxidation, can be used. For example, glacial acetic acid and ethyl acetate are satisfactory solvents. These solvents are especially useful when the reaction is carried out at room temperature.

The ozonization can be carried out at temperatures ranging from about −80° C. up to the temperature at which the ozonides decompose, e. g., 25–100° C. However, it is preferred that the reaction be carried out at low temperature, such as −70 to −80° C., in order to minimize the possibility of violent reaction taking place.

The hydrolysis step can be carried out at temperatures ranging from 25° C. to 125° C. The hydrolysis is exothermic and it is convenient to carry out this step at the reflux temperature of the reaction mixture.

Strong acids, i. e., acids having a dissociation constant, K, greater than $1 \times 10^{-2}$, besides sulfuric acid can be used to catalyze the decomposition of the ozonide. Thus hydrochloric and p-toluenesulfonic acids are satisfactory for this purpose.

The starting materials for use in the process of this invention are 3,3,4,4- and 4,4,5,5-tetrafluoro-1-cyclohexenes. These fluorocyclohexenes are prepared by pyrolysis of 1-vinyl-2,2,3,3-tetrafluorocyclobutane at 650-750° C. This pyrolysis process is described in greater detail in my application Serial No. 454,607, filed September 7, 1954. The 1-vinyl-2,2,3,3-tetrafluorocyclobutane can be prepared by the process described in U. S. Patent 2,462,347, issued to P. L. Barrick.

Ozone prepared by passing air or oxygen through ozone generators that are commercially available is operable in the process of this invention. The concentration of ozone in the air or oxygen is not critical. Any concentration produced by the generator can be used; however, extremely low concentrations require very long reaction times.

Example I

Ten parts of 3,3,4,4-tetrafluoro-1-cyclohexene is placed in 120 parts of methylene chloride and the mixture is cooled to −78° C. in a reaction vessel cooled by a mixture of acetone and solid carbon dioxide. A stream of oxygen containing 2% ozone is passed through the cold reaction mixture at a rate of 0.1 cubic ft. per minute for a period of two hours. At the end of this time the reaction mixture turns to a blue color. The methylene chloride is then removed from the reaction mixture by evaporation under reduced pressure, about 100 mm. of mercury, and 50 parts of glacial acetic acid is added to the residue. This acetic acid solution is dropped into a mixture consisting of 13 parts of 30% hydrogen peroxide, 1.8 parts of concentrated sulfuric acid, and 50 parts of distilled water. The temperature of the acid mixture increases due to the heat of reaction and external heat is applied as necessary to maintain the mixture at reflux temperature until a clear solution is obtained. The reaction mixture is then cooled to about 25° C. and extracted with diethyl ether. The ether-acetic acid layer is evaporated to dryness under reduced pressure (about 25 mm. Hg). The resulting white solid residue of 2,2,3,3-tetrafluoroadipic acid is dissolved in water, the solution is filtered, and the aqueous filtrate is extracted with ether. The ether extract is then evaporated to dryness and the resulting solid acid is dried over phosphorus pentoxide. There is obtained a nearly quantitative yield of 2,2,3,3-tetrafluoroadipic acid which can be recrystallized from xylene.

*Analysis.*—Calculated for $C_6H_6F_4O_4$: C, 33.04%; H, 2.77%; F, 34.84%; N. E., 218. Found: C, 33.38%; H, 3.10%; F, 35.1%; N. E., 219.

The infrared absorption spectrum obtained on this 2,2,3,3-tetrafluoroadipic acid confirms its structure.

Example II

Approximately 9 parts of 4,4,5,5-tetrafluoro-1-cyclohexene is dissolved in 67 parts of methylene chloride. This solution is ozonized in the same manner as that described in Example I, and the resulting ozonide is hydrolyzed in the manner described in that example. There is obtained a yield of about 50% of the theory of crude 3,3,4,4-tetrafluoroadipic acid. On recrystallization from xylene, 3,3,4,4-tetrafluoroadipic acid melts at 243–246° C.

*Analysis.*—Calculated for $C_6H_6F_4O_4$: C, 33.04%; H, 2.77%; F, 34.84%. Found: C, 33.55%; H, 3.21%; F, 34.18%.

The infrared absorption spectrum of this acid also confirms its structure as 3,3,4,4-tetrafluoroadipic acid.

Example III

Twenty-nine parts of 4,4,5,5-tetrafluoro-1-cyclohexene is ozonized in the manner described in the preceding examples. The resulting solution of the ozonide in methylene chloride is dropped directly into a solution of hydrogen peroxide, acetic acid, water and sulfuric acid (all ingredients in the same proportions as given in Example I). External heat is applied to the reaction mixture and the methylene chloride is boiled off. When the temperature of the mixture reaches 100° C., a reflux condenser is attached to the reaction vessel and heating is continued under reflux until a clear solution is obtained. The reaction mixture is concentrated under reduced pressure and 3,3,4,4-tetrafluoroadipic acid precipitates out of solution. This product is collected by filtration and dried over phosphorus pentoxide. The yield of 3,3,4,4-tetrafluoroadipic acid, M. P. 247–248° C., is 29 parts, which corresponds to 70% of theory.

Example IV

A mixture of 10 parts of 3,3,4,4-tetrafluoroadipic acid and 20 parts of thionyl chloride is heated at reflux until evolution of hydrogen chloride ceases. The excess thionyl chloride is removed by distillation and the residue is rapidly distilled at a pressure of 50 mm. mercury, and 2.5 parts of 3,3,4,4-tetrafluoroadipyl chloride is isolated. This acid chloride is added to 10 parts of ethanol and the resulting mixture is diluted with water until two phases are formed. The organic layer is washed with water and then dried over anhydrous magnesium sulfate. There is obtained 2.5 parts of product having a refractive index, $n_D^{25}$, of 1.3920. Nuclear magnetic resonance analysis shows that the product is diethyl 3,3,4,4-tetrafluoroadipate.

The esters of the tetrafluoroadipic acids are prepared by reaction of the free acids, their chlorides, or their anhydrides with an alcohol by conventional esterification methods. Thus, the acid or its anhydride can be reacted with the alcohol in the presence of an esterification catalyst, e. g., hydrogen chloride, sulfuric acid, or p-toluenesulfonic acid. The esterification can also be carried out in the presence of a diluent which forms an azeotrope with the water formed as a by-product. Hydrocarbons such as toluene are especially useful in this process. By this modification the water formed as a reaction product can be continuously removed from the reaction system as the azeotrope, the water separated from the azeotrope and then the diluent returned to the reaction system. Esters of the tetrafluoroadipic acids with phenols are prepared by converting the tetrafluoroadipic acid to the acid chloride, e. g., by means of thionyl chloride, and then reacting the acid chloride with an alkali metal salt of a phenol, e. g., sodium phenolate. Thus there are prepared the methyl, ethyl, n-butyl, n-dodecyl, cyclohexyl, phenyl, naphthyl, and ethylene glycol esters of 2,2,3,3- and 3,3,4,4-tetrafluoroadipic acids. Other esters of the acids can likewise be prepared, e. g., the esters of 2,2,3,3- and 3,3,4,4-tetrafluoroadipic acids with the telomer alcohols obtained from tetrafluoroethylene and methanol by the process described in U. S. Patent 2,559,628. The esters of this invention include both the diesters and the monoesters of the dibasic acids.

The tetrafluoroadipic acids of this invention, having two adjacent $CF_2$ groups and two $CH_2$ groups in the chain of atoms separating the two carboxyl groups possess various properties which are not shown by closely related fluoroadipic acids or unsubstituted adipic acids. Thus, the sodium salt of monomethyl 2,2,3,3-tetrafluoroadipic acid

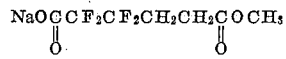

pyrolyzes on heating to sodium fluoride, carbon dioxide, and methyl 4,5,5-trifluoro-4-pentenoate. This reaction does not take place with adipic acid. As another example, monomethyl 2,2,3,3-tetrafluoroadipyl chloride

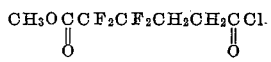

on reaction with sodium azide followed by heating and treatment with methanol yields

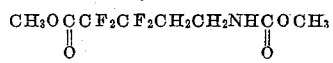

This reaction will not take place with the closely related perfluoroadipic acid derivative. Furthermore, the tetrafluoroadipic acids of this invention form polymeric anhydrides. In contrast to this, such fluorinated acids as 2,2-difluorosuccinic and 2,2-difluoroglutaric acids form monomeric anhydrides.

The tetrafluoroadipic acids of this invention or their acid chlorides are especially useful for reaction with dihydric alcohols to form polyesters. For example, the 2,2,3,3-tetrafluoroadipic acid is especially well suited for reaction at temperatures of 200° to 250° C., in accordance with conditions described in U. S. Patent 2,071,250, with ethylene glycol to form polyethylene 2,2,3,3 - tetrafluoroadipate. The 3,3,4,4 - tetrafluoroadipates are preferably formed by reaction of the acid chloride with the glycol, e. g., ethylene glycol, at ordinary temperature. These polyesters are useful in films, plastics, and coating compositions. The 2,2,3,3-tetrafluoroadipic acids and their esters, particularly with volatile alcohols and phenols, are suitable for reaction at 200° to 300° C., in accordance with conditions described in U. S. Patent 2,130,948, with diamines, e. g., hexamethylene diamine, to form polyamides. The resulting polymers are useful for the formation of films, fibers, coating compositions and plastics. The monomeric esters of the tetrafluoroadipic acids of this invention, particularly the esters with higher alcohols, i. e., alcohols having six or more carbon atoms, and phenols, are useful as plasticizers for natural and synthetic resins, e. g., in amounts of 10% to 30% with ethylcellulose.

3,3,4,4-tetrafluoroadipic acid is effective as an inhibitor of the growth of nitrogen-fixing bacteria. This acid completely inhibits growth of *Clostridium pasteurianum* cultures at 50 mg./liter concentration. This is unexpected inasmuch as the unsaturated difluoro acid, 3,4-difluoro-3-hexenedioic acid, does not affect the *C. pasteurianum* cells.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. A tetrafluoroadipic acid, $C_6H_6O_4F_4$, having two fluorines on each of two adjacent carbon atoms in the carbon chain joining the two carboxyl groups.
2. 2,2,3,3-tetrafluoroadipic acid.
3. 3,3,4,4-tetrafluoroadipic acid.
4. The process which comprises ozonizing a tetrafluorocyclohexene having two fluorines on each of two adjacent ring carbons of the cyclohexene ring nad having only hydrogen on remaining ring carbons and bringing the ozonization product in contact with aqueous hydrogen peroxide containing an acid having a dissociation constant greater than $1 \times 10^{-2}$.
5. The process which comprises ozonizing 4,4,5,5-tetrafluoro-1-cyclohexene and bringing the ozonization product in contact with aqueous hydrogen peroxide containing an acid having a dissociation constant greater than $1 \times 10^{-2}$.
6. The process which comprises ozonizing 3,3,4,4-tetrafluoro-1-cyclohexene and bringing the ozonization product in contact with aqueous hydrogen peroxide containing an acid having a dissociation constant greater than $1 \times 10^{-2}$.
7. An ester of an acid according to claim 1 and a member of the group consisting of alcohols and phenols having up to 12 carbons.
8. Diethyl 3,3,4,4-tetrafluoroadipate.

References Cited in the file of this patent

Henne et al.: J. A. C. S., vol. 65, 1943, pp. 752–754.
Tatlow et al.: C. A., vol. 47, 1953 (p. 1070).